Sept. 11, 1956     E. H. OSTRANDER     2,762,859
WETTING HEAD PRESS
Filed Sept. 15, 1953
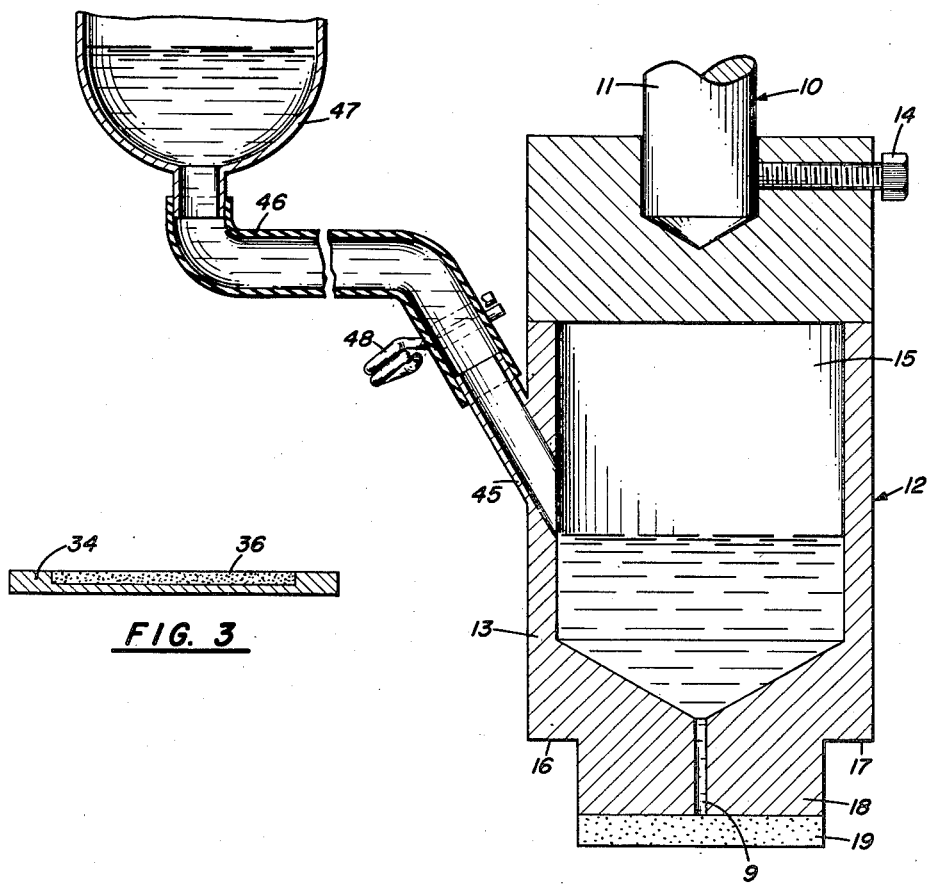
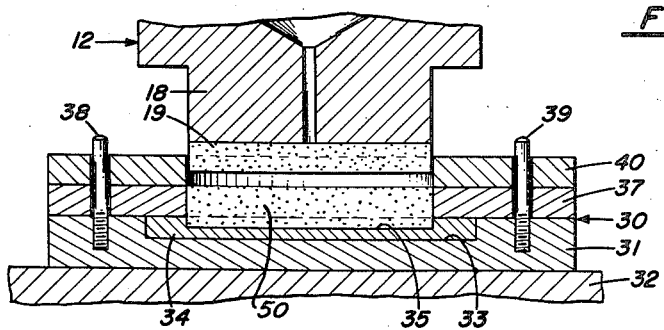
INVENTOR
ELINOR H. OSTRANDER
BY
ATTORNEYS United States Patent Office 2,762,859
Patented Sept. 11, 1956

2,762,859

WETTING HEAD PRESS

Elinor H. Ostrander, Hyattsville, Md., assignor to the United States of America as represented by the Secretary of the Navy Application September 15, 1953, Serial No. 380,381

8 Claims. (Cl. 136—122)

(Granted under Title 35, U. S. Code (1952), sec. 266)

This invention relates to battery manufacture with special reference to a wetting press for making activated carbon cakes for chlorine-depolarized cells.

In chlorine-depolarized cells use is made of plural cathode plates or wafers stacked for voltage increment, each plate having formed on one face thereof a recess containing a compressed layer of carbon black saturated with the necessary electrolyte. Heretofore the saturation of the carbon black and its forced placement in the carbon plate cathode has been performed as a sequence of operations usually under different physical arrangements. In the present invention both the electrolyte saturation and compression of carbon black into the cathode cake recess are accomplished simultaneously and rapidly by a single mechanism.

The objects of the invention, therefore, include the mechanization of the step of electrolyte saturation of the carbon black; the combination of the pressure and saturation steps; and the simplification of operation and reduction of time in securing a compressed and saturated cathode structure.

Other objects and advantages will be apparent on consideration of the following detailed description taken in connection with accompanying drawings wherein:

Fig. 1 is an elevation, partly in section, of the pressure head and electrolyte feed;

Fig. 2 is an enlarged sectional detail of the pressure action on the loose carbon black in the mold; and Fig. 3 is a sectional elevation of the completed cathode plate of the battery.

The apparatus for accomplishing the named objects is illustrated in Figs. 1 and 2 wherein a press, preferably of the usual hydraulic type, is indicated generally by the numeral 10.

Secured to the press plunger 11 is a head unit 12 formed of an enlarged tubular member 13 closed at its upper end by a chuck recessed to receive the plunger rod 11. Secure and rigid connection between chuck and rod is maintained by set-screw 14. The lower end of the head chamber 15 is funnel shaped and closed by a terminal block provided with a central axial bore or duct 9 of capillary dimensions.

The end of the plunger head 12 is preferably plane at the end face and narrowed in transverse dimensions by offsets 16 and 17 to form the pressure element 18. To the plane end surface is applied a disk of porous carbon 19 having a flat terminal face. Any suitable attachment medium may be used to make a firm connection between the plunger head and carbon disk, Lucite being found satisfactory.

In Fig. 2 the mold unit 30 is shown. This unit includes the jig 31 mounted on the stationary press element 32, directly beneath the movable plunger head 12. The upper face of the jig is formed with a recess 33 dimensioned to receive a carbon cathode wafer 34. The wafer in turn is formed on its upper face with a recess 35, dimensioned to receive the electrolyte saturated carbon black cake 36 (Fig. 3).

In order to confine the loose carbon black 50 to the area of wafer recess 35, a mold plate 37 is used. This plate is provided with a central mold opening and edge guide openings adapted to receive slidably the guide pins 38 and 39, the latter being fixed to the jig 31. The mold opening conforms in dimensions to the wafer recess 35 so that the carbon black powder 50, deposited in the mold, will completely fill the recess.

Desirably, also, use is made of guide plate 40, this plate having guide openings registering with guide pins 38 and 39, and a mold guide opening centrally thereof and in uniform registry with the mold opening of mold plate 37. The dimensions of the plunger head member 18 and attached carbon plate 19 are such as to enter and completely fill the mold guide and mold openings in plates 37 and 40 and thus engage the enclosed carbon black powder throughout its area in wafer recess 35, without important leakage.

To apply the electrolyte to the cake the plunger head chamber 15 is provided with an inlet duct 45 through which, by means of flexible tubing 46, electrolyte is supplied from stationary reservoir 47. A valve, shown as pinch-cock 48, is employed to control the flow. By this means, chamber 15 is filled to a desired level with the required electrolyte, and due to the small cross section of the capillary bore 9, flow of liquid therethrough may readily be controlled by valve 48 since flow in the capillary duct ceases as soon as valve 48 is closed. By using a reservoir supply at approximate atmospheric pressure and placing this supply in the press plunger in close proximity to the point of use, not only is the disk saturation attained with rapidity but the substantially constant reservoir pressure permits a uniform sequence of saturation steps which aids materially in speeding the manufacturing process.

In operation, with the press open, valve 48 is opened to permit gravity flow of electrolyte into chamber 15 and through capillary duct 9 into the porous carbon disk 19 until the disk is saturated. This flow is facilitated by the fact that the carbon disk is porous by virtue of numerous passages throughout its mass, these passages being capillary in dimensions and connecting with capillary tube 9 to absorb liquid from chamber 15. The valve is then closed. With powdered carbon black placed in the wafer recess 35 and mold 37 to the approximate level indicated in Fig. 2, power is applied to the press, and in consequence, the pressure head element 18 with the attached saturated carbon disk 19 is lowered through guide plate 40 and compresses the carbon black while simultaneously this material receives the electrolyte forced out of the disk by capillary action. This pressure is continued for about fifteen seconds, the value of pressure being around fifty-two pounds per square inch. As a result, on release of pressure, the carbon black, now saturated with electrolyte, is compacted to a level flush with the wafer surface as shown at 36 in Fig. 3. These treated wafers may now be assembled in block form as desired.

It is pointed out that the described method lends itself to rapid production of activated wafers, and further that the mold plate, being removable, may readily be replaced to take care of varied wafer recesses. Also, the association of the carbon disk and chamber 15 through the capillary tube 15 permits effective control of liquid flow by valve 48. In addition, the carbon disk, being of fixed dimensions insures a fixed measured quantity of electrolyte supplied to the carbon black.

Modifications and variations of this invention are possible in the light of the disclosure, and it is to be understood, therefore, that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A wetting head press for battery cake manufacture comprising a movable press plunger head hollowed to form a chamber for reception of a liquid electrolyte, an inlet to said chamber for supply of electrolyte thereto, a valve for closing said inlet, a duct of capillary dimensions in the end of said plunger head for flow of electrolyte therethrough from said chamber, and a disk of porous carbon having flow passages therein of capillary dimensions serving as extensions of said plunger head capillary duct secured to the plunger head to underlie said head and duct whereby the disk may become saturated with a fixed amount of electrolyte on actuation of said valve.

2. A wetting press for battery cake manufacture comprising a movable press plunger head hollowed to form a chamber for reception of a liquid electrolyte, an inlet to said chamber for supply of electrolyte thereto, a valve for closing said inlet, a duct of capillary dimensions in the end of said plunger head for escape of electrolyte therethrough from said chamber, a disk of porous carbon secured to the plunger head to underlie said head and duct, said carbon having flow passages therein of capillary dimensions serving as extensions of said plunger head capillary duct, a stationary press member cooperatively related to said plunger head to be compressed thereby, a jig plate having a battery cake recess formed on one side thereof mounted on said stationary press member, a mold plate removably secured on said stationary press member above the recess in said jig plate, and a guide plate removably secured to said jig above said mold plate for alining the mold with said plunger head.

3. A wetting press for battery cake manufacture comprising a movable press plunger head hollowed to form a chamber for reception of a liquid electrolyte, an inlet to said chamber for supply of electrolyte thereto, a valve for closing said inlet, a duct of capillary dimensions in the end of said plunger head for escape of electrolyte therethrough from said chamber, a disk of porous carbon secured to the plunger head to underlie said head and duct, said carbon having flow passages therein of capillary dimensions serving as extensions of said plunger head capillary duct, a stationary press member cooperatively related with said plunger to be compressed thereby, a jig plate having a battery cake recess formed on one side thereof mounted on said stationary press member, a plurality of guide pins fixed to said jig, a mold plate having a mold opening therein and guide opening dimensioned for sliding movement on said guide pins, a guide plate having a mold guide opening therein registering with said mold opening and guide pin openings dimensioned for sliding movement on said guide pins, the dimensions of said plunger head and attached carbon plate being such as to permit close sliding movement within said mold guide and mold openings.

4. The method of forming a compressed electrolyte saturated layer of carbon black for an electric battery plate which comprises forming a rigid pressure plate of absorbent material containing flow passages therein of capillary dimensions and having a plane pressure face, gravity feeding electrolyte through a capillary duct into said material until the material is saturated, closing the path of electrolyte flow to said pressure plate to fix the limit of pressure plate electrolyte, and applying said plate to a loose mass of confined granulated carbon black under maintained pressure for a time sufficient simultaneously to agglomerate the carbon black and to permit flow of the electrolyte from the plate to the carbon black by capillary action.

5. A method of forming a compacted liquid-impregnated article of powdered material which comprises confining the material in a closed receptacle having a movable absorbent wall, flowing a quantity of liquid under gravity pressure to said movable wall to saturate the same, stopping said flow, and applying pressure to said wall simultaneously to compact the material to the desired dimensions and force the liquid into said material by capillary action from said wall.

6. The method of forming a compressed electrolyte-saturated layer of carbon black for an electric battery plate as defined in claim 4, said plate pressure continuing for about fifteen seconds at a uniform value of around fifty-two pounds per square inch.

7. A wetting head press for battery cake manufacture comprising a movable press plunger head hollowed to form an air-liquid chamber, an inlet to said chamber for supply of air and electrolyte thereto, a valve for closing said inlet, a disk of carbon having pores of capillary dimensions forming passages therein secured to the plunger head to underlie said head, and an open duct of capillary diameter positioned in said head and forming a continuous connection from said chamber to the surface of said disk for gravity feed of electrolyte to said disk, said disk serving both as a measure of liquid supply to the battery cake and an element of pressure communication to the cake from said plunger head.

8. A wetting press for battery cake manufacture, comprising a mold unit having a receiving chamber for reception of cake powder, a disk of porous carbon for direct pressure contact on said cake powder, means including a source of battery electrolyte and a capillary duct joining said source and disk for saturating said disk with said electrolyte, and means for holding said electrolyte saturated disk in direct contact with said cake powder under pressure until the powder absorbs the electrolyte from the disk, whereby a fixed charge of electrolyte is received by said cake powder.

References Cited in the file of this patent
UNITED STATES PATENTS

| | | |
|---|---|---|
| 764,361 | Jacques | July 5, 1904 |
| 2,626,738 | Nordquist | Jan. 27, 1953 |